United States Patent [19]

Spencer

[11] 3,770,467

[45] Nov. 6, 1973

[54] REFRACTORY SUBSTANCE

[75] Inventor: Denzil Reginald Frank Spencer, Oldcotes, near Worksop, England

[73] Assignee: Steetley (Mfg.) Limited, Worksop, England

[22] Filed: Oct. 8, 1971

[21] Appl. No.: 187,906

[30] Foreign Application Priority Data
Oct. 9, 1970    Great Britain.................... 48,176/70

[52] U.S. Cl. ................................................ 106/58
[51] Int. Cl............................................ C04b 35/04
[58] Field of Search.............................. 106/58, 61

[56] References Cited
UNITED STATES PATENTS
3,378,383    4/1968    Van Dreser........................... 106/58
3,364,043    1/1968    Davies ................................. 106/58

Primary Examiner—Delbert E. Gantz
Assistant Examiner—S. Berger
Attorney—Bacon & Thomas

[57] ABSTRACT

A dead-burned refractory magnesia composition suitable for use in the manufacture of high hot strength magnesia refractories comprises at least 95% by weight MgO, less than 0.4% by weight of silica, an amount of lime greater than (2S + 0.3)% by weight, where S is the percentage by weight of silica, the weight ratio of lime to silica in the composition being greater than 3:1, and boron in an amount of less than 0.25% by weight expressed as $B_2O_3$.

2 Claims, No Drawings

REFRACTORY SUBSTANCE

The present invention relates to refractory materials and in particular to refractory grade magnesia compositions and to refractory products such as refractory bricks which are made therefrom.

It is at the present time a widely held belief in the refractory industry that, for any given quality of magnesia, the lower the boron content the greater the high temperature strength of the grain or the bricks made from such magnesias. It has now been found however that for magnesias having silica contents of less than 0.4% by weight and containing lime and silica at lime/silica weight ratios greater than 3:1 boron contents sometimes as high as 0.25% by weight $B_2O_3$ can be tolerated while maintaining comparatively high strength at elevated temperatures.

Accordingly the present invention provides a dead-burned refractory magnesia composition comprising at least 95% by weight MgO, preferably at least 97% by weight MgO, less than 0.4% by weight of silica, preferably from 0.005 to 0.02% by weight of silica, an amount of lime greater than $(2S + 0.3)\%$ by weight, preferably greater than $(2S + 0.5)\%$ by weight, where S is the percentage by weight of silica, the weight ratio of lime to silica in the composition being greater than 3:1 and boron in an amount of less than 0.25% by weight expressed as $B_2O_3$.

While quite significant levels of $B_2O_3$ can be tolerated in the magnesia composition of the present invention, it has to be appreciated that there is some falling off in high temperature strength at silica contents in the region of about 0.3% by weight with $B_2O_3$ levels at about 0.2% and it is preferred in order to obtain good strength at the higher silica contents to limit the $B_2O_3$ content to less than about 0.1%. In general the minimum $B_2O_3$ need only be about $0.25S^2$ and the maximum $B_2O_3$ may be about $(0.25 - 1.2S^2)\%$, where S is the percentage weight silica. Some advantage may be obtained by operating at a $B_2O_3$ level below $(0.3 - 0.8S)\%$.

Iron oxide and alumina may be present in the composition of the present invention but the amount of these materials is preferably maintained at a minimum. For example the amount of iron oxide and alumina is less than 0.4% by weight, preferably less than 0.2% by weight, of $R_2O_3$ where $R_2O_3$ represents the total weight of $Fe_2O_3$ and $Al_2O_3$. In general the amount of $R_2O_3$ materials which can be tolerated decreases as the amount of lime present increases and $R_2O_3$ is desirably of the order of 0.1% by weight at high lime contents e.g. at about 2% CaO or more.

The refractory composition of the present invention may be obtained from magnesia-containing minerals but is preferably obtained from synthetic magnesias i.e. magnesias which have been precipitated from bitterns, brines or sea water by treatment thereof with alkali or which have been obtained by thermal decomposition of magnesium chloride. Thermal decomposition of magnesium chloride is preferably carried out by the method described in British Patent Specification No. 793700 which comprises the steps of disintegrating the magnesium chloride in the molten state or as an aqueous solution into a suitable directed spray of predetermined length of path, contacting the spray with a stream of hot gas in the presence of water-vapour and thermally decomposing the sprayed particles before they reach the end of said path. In order to obtain the particular composition of the present invention it may be necessary to purify and/or to make additions of for example chrome-, lime-, or zirconia-bearing materials to the magnesia and/or to modify the conditions under which the magnesia is formed. The magnesia will be one which has been dead-burned or which has been pelletised and dead-burned.

The refractory compositions of the present invention with or without other refractory materials may be made into bricks, blocks, cements, ramming compositions gunning mixes or castables and these may be used in furnace constructions. They are characterized by good density and strength at high temperatures.

The following examples are given to illustrate the present invention.

EXAMPLES 1 to 8

A series of sea water magnesias of varying analyses were lightly calcined at a temperature in the range 600° to 1,000° C. until the magnesia had between 0.5% and 2% ignition loss. The contents of the impurities lime, silica, iron oxide and aluminum oxide were then adjusted to the required levels by adding an appropriate amount of material, for example, silica, lime, zircon and zirconia, chrome, etc., and mixing thoroughly. The mixture was then pelletised at 20 tons per square inch and dead-burned at 1,500° C. to 1,800° C.

The dead-burned magnesias were made into bricks by the following method. The magnesias were crushed and graded into a batch suitable for brick-making containing 65% of particles between 5 and 72 B.S.S. mesh and 35% of particles passing a 72 B.S.S. mesh. Approximately 4% of sulphite lye solution of specific gravity 1.2% was added to the mixture pressed in a mould at 8 tons per square inch. The resulting bricks were fired in the range of 1,650° to 1,800° C. over a 112 hour schedule.

Modules of rupture was determined on the bricks at various temperatures. The results are set out in Table I from which it will be seen that each of the exemplified magnesia compositions from which the bricks were made possessed analyses within the scope of the present invention and each brick was shown to have comparatively high strength at elevated temperatures.

TABLE 1

|  | Example No. | | | | | | | |
|---|---|---|---|---|---|---|---|---|
|  | 1 | 2 | 3 | 4 | 5 | 6 | 7 | 8 |
| Magnesia analysis percent: | | | | | | | | |
| CaO | 0.9 | 1.41 | 1.38 | 1.2 | 1.2 | 0.9 | 1.0 | 0.85 |
| $SiO_2$ | .1 | 0.08 | .25 | 0.3 | 0.3 | .2 | 0.1 | .04 |
| $Al_2O_3$ | .05 | .07 | .03 | .2 | .2 | .2 | .04 | .05 |
| $Fe_2O_3$ | .1 | .1 | .12 | .15 | .15 | .15 | 1.1 | .95 |
| $Cr_2O_3$ |  |  |  |  | .3 | .3 |  |  |
| $ZrO_2$ |  | .4 | .3 |  |  |  |  |  |
| $B_2O_3$ | .2 | .18 | .16 | .02 | .04 | .03 | .1 | .16 |

| Modulus of rupture p.s.i. at: | | | | | | | | |
|---|---|---|---|---|---|---|---|---|
| 1260°C | 2,300 | 2,150 | 1,800 | | | | 2,300 | 2,400 |
| 1350°C | 1,100 | | | | | | 1,300 | 1,400 |
| 1400°C | | 950 | 750 | 2,200 | 1,300 | 1,150 | | |
| 1500°C | | 850 | 650 | 1,500 | 1,150 | 1,000 | | |
| 1550°C | 900 | | | | | | 1,000 | 1,050 |
| 1600°C | | | | 1,000 | 750 | 850 | | |

COMPARATIVE EXAMPLES

By way of comparison, the modules of rupture of bricks having a lime to silica ratio below 3:1 was measured using the same techniques as used in Examples 1 to 8. The formulations used and the results obtained are given in Table 2 as Comparative Examples a to e.

The results obtained indicate that bricks made from magnesias having similar analyses to those used in Examples 1 to 8 but with lower lime to silica ratios have much lower strengths.

TABLE 2

Comparative Examples:

| Magnesia Analysis % | a | b | c | d | e |
|---|---|---|---|---|---|
| CaO | 0.22 | 0.16 | 0.50 | 0.7 | 0.4 |
| SiO$_2$ | 0.1 | 0.08 | 0.25 | 0.3 | 0.2 |
| Al$_2$O$_3$ | 0.05 | 0.07 | 0.03 | 0.2 | 0.2 |
| Fe$_2$O$_3$ | 0.1 | 0.1 | 0.12 | 0.15 | 0.15 |
| Cr$_2$O$_3$ | | | | | 0.3 |
| ZrO$_2$ | | 0.4 | 0.3 | | |
| B$_2$O$_3$ | 0.2 | 0.18 | 0.16 | 0.02 | 0.03 |
| Modulus of Rupture p.s.i. at: | | | | | |
| 1260°C | 250 | 220 | 350 | 700 | 500 |
| 1400°C | | | 100 | 250 | 150 |

I claim:

1. A dead-burned refractory magnesia composition comprising at least 95% by weight MgO, from 0.005% to 0.2% by weight of silica, an amount of lime greater than $(2S + 0.5)\%$ by weight, where S is the percentage by weight of silica, and boron in an amount of 0.1% to 0.25% by weight expressed as B$_2$O$_3$.

2. A dead-burned refractory magnesia composition according to claim 1 comprising at least 97% by weight MgO.

* * * * *